(12) United States Patent
Howell et al.

(10) Patent No.: US 11,874,418 B2
(45) Date of Patent: Jan. 16, 2024

(54) HIGH RESOLUTION COMPOSITE SEISMIC IMAGING, SYSTEMS AND METHODS

(71) Applicant: Borehole Seismic, LLC., Houston, TX (US)

(72) Inventors: Robinson Butler Howell, Houston, TX (US); Zhao Li, Houston, TX (US)

(73) Assignee: Borehole Seismic, LLC., Houston, TX (US)

( * ) Notice: Subject to any disclaimer, the term of this patent is extended or adjusted under 35 U.S.C. 154(b) by 648 days.

(21) Appl. No.: 16/388,730

(22) Filed: Apr. 18, 2019

(65) Prior Publication Data

US 2020/0018870 A1 Jan. 16, 2020

Related U.S. Application Data

(60) Provisional application No. 62/659,642, filed on Apr. 18, 2018.

(51) Int. Cl.
| | | |
|---|---|---|
| *G01V 1/30* | (2006.01) | |
| *E21B 47/09* | (2012.01) | |
| *G01V 1/28* | (2006.01) | |
| *G01V 1/00* | (2006.01) | |
| *G01V 1/38* | (2006.01) | |
| *G01V 11/00* | (2006.01) | |

(52) U.S. Cl.
CPC .............. *G01V 1/301* (2013.01); *E21B 47/09* (2013.01); *G01V 1/288* (2013.01); *G01V 1/003* (2013.01); *G01V 1/3817* (2013.01); *G01V 11/005* (2013.01); *G01V 2210/54* (2013.01); *G01V 2210/646* (2013.01); *G01V 2210/65* (2013.01)

(58) Field of Classification Search
CPC .... G01V 1/301; G01V 1/288; G01V 2210/54; G01V 2210/646; E21B 47/09
See application file for complete search history.

(56) References Cited

U.S. PATENT DOCUMENTS

| | | |
|---|---|---|
| 4,887,671 A | 12/1989 | Stevens, Jr. |
| 6,364,015 B1 | 4/2002 | Upchurch |
| 8,794,316 B2 | 8/2014 | Craig |
| 9,909,414 B2 * | 3/2018 | Bittar ...................... E21B 49/00 |
| 10,302,785 B2 * | 5/2019 | Dirksen ................... G01V 1/50 |

(Continued)

FOREIGN PATENT DOCUMENTS

| | | | |
|---|---|---|---|
| WO | WO-2016185223 A1 * | 11/2016 | ......... G01D 5/35306 |
| WO | WO 2017/052525 | 3/2017 | |
| WO | WO 2017/059539 | 4/2017 | |

OTHER PUBLICATIONS

Jul. 30, 2019, PCT, PCT/US2019/028182 Search Report.

(Continued)

*Primary Examiner* — Ian J Lobo
(74) *Attorney, Agent, or Firm* — Belvis Law, LLC.; Glen P. Belvis

(57) ABSTRACT

There is provided systems and methods for providing enhanced high definition images of subterranean activities, and structures using migrated data from two independent sources. There are provided systems and methods for imaging hydraulic fracturing and hydraulic fractures and the resultant images of hydraulic fracturing and hydraulic fractures, including the image of the shape of the fracture.

14 Claims, 18 Drawing Sheets
(18 of 18 Drawing Sheet(s) Filed in Color)

(56) References Cited

U.S. PATENT DOCUMENTS

| | | | |
|---|---|---|---|
| 10,422,907 B2* | 9/2019 | Solum | G01V 1/345 |
| 2007/0084602 A1 | 4/2007 | Curimbaba | |
| 2007/0277977 A1 | 12/2007 | Mesher | |
| 2008/0164030 A1 | 7/2008 | Young | |
| 2011/0203847 A1 | 8/2011 | Randall | |
| 2013/0048282 A1 | 2/2013 | Adams | |
| 2013/0100770 A1 | 4/2013 | Diller et al. | |
| 2014/0119157 A1 | 5/2014 | Whitmore, Jr. et al. | |
| 2015/0007988 A1 | 1/2015 | Ayasse | |
| 2017/0051598 A1* | 2/2017 | Ouenes | E21B 43/26 |
| 2017/0074999 A1* | 3/2017 | Walters | G01V 1/42 |
| 2017/0145793 A1* | 5/2017 | Ouenes | E21B 43/26 |
| 2017/0321110 A1 | 11/2017 | Hofstatter | |
| 2017/0323477 A1 | 11/2017 | Plateaux et al. | |
| 2018/0203144 A1* | 7/2018 | Karrenbach | G01D 5/3538 |
| 2021/0017842 A1 | 1/2021 | Howell | |

OTHER PUBLICATIONS

Jul. 30, 2019, PCT, PCT/US2019/028182 Opinion.
Sep. 14, 2018, PCT, PCT/US2018/029454 Search Report.
Sep. 14, 2018, PCT, PCT/US2018/029454 Opinion.

* cited by examiner

HIGH RESOLUTION COMPOSITE SEISMIC IMAGING, SYSTEMS AND METHODS

This application claims under 35 U.S.C. § 119(e)(1) the benefit of the filing date of U.S. provisional application Ser. No. 62/659,642 filed Apr. 18, 2018, the entire disclosure of which is incorporated herein by reference.

BACKGROUND OF THE INVENTION

Field of the Invention

The present inventions relate to the enhanced seismic imaging based upon the combination of multiple different types of seismic information. The present enhanced composite seismic imaging systems, methods and information find application in the exploration, discovery, and recovery of natural resources from within the earth; including systems, apparatus and methods to increase the production of natural resources from existing producing locations, minimizing the level of decline in production from existing production locations, and preferably increasing the level of production from existing production locations. In particular, an embodiment of the present inventions, relates to enhanced composite seismic data collection and imaging for the enhanced recovery of hydrocarbons, e.g., crude oil and natural gas, from new and existing wells from unconventional shale formations within the earth.

In the production of natural resources from formations within the earth a well or borehole is drilled into the earth to the location where the natural resource is believed to be located. These natural resources may be a hydrocarbon reservoir, containing natural gas, crude oil and combinations of these; the natural resource may be fresh water; it may be a heat source for geothermal energy; or it may be some other natural resource that is located within the ground.

These resource-containing formations may be a few hundred feet, a few thousand feet, or tens of thousands of feet below the surface of the earth, including under the floor of a body of water, e.g., below the sea floor. In addition to being at various depths within the earth, these formations may cover areas of differing sizes, shapes and volumes.

Unfortunately, and generally, when a well is drilled into these formations the natural resources rarely flow into the well at rates, durations and amounts that are economically viable. This problem occurs for several reasons, some of which are well understood, others of which are not as well understood, and some of which may not yet be known. These problems can relate to the viscosity of the natural resource, the porosity of the formation, the geology of the formation, the formation pressures, and the perforations that place the production tubing in the well in fluid communication with the formation, to name a few.

Typically, and by way of general illustration, in drilling a well an initial borehole is made into the earth, e.g., the surface of land or seabed, and then subsequent and smaller diameter boreholes are drilled to extend the overall depth of the borehole. In this manner as the overall borehole gets deeper its diameter becomes smaller; resulting in what can be envisioned as a telescoping assembly of holes with the largest diameter hole being at the top of the borehole closest to the surface of the earth.

Thus, by way of example, the starting phases of a subsea drill process may be explained in general as follows. Once the drilling rig is positioned on the surface of the water over the area where drilling is to take place, an initial borehole is made by drilling a 36" hole in the earth to a depth of about 200-300 ft. below the seafloor. A 30" casing is inserted into this initial borehole. This 30" casing may also be called a conductor. The 30" conductor may or may not be cemented into place. During this drilling operation a riser is generally not used and the cuttings from the borehole, e.g., the earth and other material removed from the borehole by the drilling activity are returned to the seafloor. Next, a 26" diameter borehole is drilled within the 30" casing, extending the depth of the borehole to about 1,000-1,500 ft. This drilling operation may also be conducted without using a riser. A 20" casing is then inserted into the 30" conductor and 26" borehole. This 20" casing is cemented into place. The 20" casing has a wellhead secured to it. (In other operations an additional smaller diameter borehole may be drilled, and a smaller diameter casing inserted into that borehole with the wellhead being secured to that smaller diameter casing.) A BOP (blow out preventer) is then secured to a riser and lowered by the riser to the sea floor; where the BOP is secured to the wellhead. From this point forward all drilling activity in the borehole takes place through the riser and the BOP.

It should be noted that riserless subsea drilling operations are also contemplated.

For a land based drill process, the steps are similar, although the large diameter tubulars, 30"-20" are typically not used. Thus, and generally, there is a surface casing that is typically about 13⅜" diameter. This may extend from the surface, e.g., wellhead and BOP, to depths of tens of feet to hundreds of feet. One of the purposes of the surface casing is to meet environmental concerns in protecting ground water. The surface casing should have sufficiently large diameter to allow the drill string, product equipment such as ESPs and circulation mud to pass through. Below the casing one or more different diameter intermediate casings may be used. (It is understood that sections of a borehole may not be cased, which sections are referred to as open hole.) These can have diameters in the range of about 9" to about 7", although larger and smaller sizes may be used, and can extend to depths of thousands and tens of thousands of feet. Inside of the casing and extending from a pay zone, or production zone of the borehole up to and through the wellhead on the surface is the production tubing. There may be a single production tubing or multiple production tubings in a single borehole, with each of the production tubing endings being at different depths.

Typically, when completing a well, it is necessary to perform a perforation operation, and perform a hydraulic fracturing, or fracing operation. In general, when a well has been drilled and casing, e.g., a metal pipe, is run to the prescribed depth, the casing is typically cemented in place by pumping cement down and into the annular space between the casing and the earth. (It is understood that many different down hole casing, open hole, and completion approaches may be used.) The casing, among other things, prevents the hole from collapsing and fluids from flowing between permeable zones in the annulus. Thus, this casing forms a structural support for the well and a barrier to the earth.

While important for the structural integrity of the well, the casing and cement present a problem when they are in the production zone. Thus, in addition to holding back the earth, they also prevent the hydrocarbons from flowing into the well and from being recovered. Additionally, the formation itself may have been damaged by the drilling process, e.g., by the pressure from the drilling mud, and this damaged area of the formation may form an additional barrier to the flow of hydrocarbons into the well. Similarly, in most situations where casing is not needed in the production area, e.g., open hole, the formation itself is generally tight, and more typically can be very tight, and thus, will not permit the hydrocarbons to flow into the well. In some situations the formation pressure is large enough that the hydrocarbons readily flow into the well in an uncased, or open hole. Nevertheless, as formation pressure lessens a point will be reached where the formation itself shuts-off, or significantly reduces, the flow of hydrocarbons into the well. Also, such low formation pressure could have insufficient force to flow fluid from the bottom of the borehole to the surface, requiring the use of artificial lift.

To address, in part, this problem of the flow of hydrocarbons (as well as other resources, e.g., geothermal) into the well being blocked by the casing, cement and the formation itself, openings, e.g., perforations, are made in the well in the area of the pay zone. Generally, a perforation is a small, about ¼ "to about 1" or 2" in diameter hole that extends through the casing, cement and damaged formation and goes into the formation. This hole creates a passage for the hydrocarbons to flow from the formation into the well. In a typical well, a large number of these holes are made through the casing and into the formation in the pay zone.

Generally, in a perforating operation a perforating tool or gun is lowered into the borehole to the location where the production zone or pay zone is located. The perforating gun is a long, typically round tool, that has a small enough diameter to fit into the casing or tubular and reach the area within the borehole where the production zone is believed to be. Once positioned in the production zone a series of explosive charges, e.g., shaped charges, are ignited. The hot gases and molten metal from the explosion cut a hole, i.e., the pert or perforation, through the casing and into the formation. These explosive-made perforations extend a few inches, e.g., 6" to 18" into the formation.

The ability of, or ease with which, the natural resource can flow out of the formation and into the well or production tubing (into and out of, for example, in the case of engineered geothermal wells, and some advanced recovery methods for hydrocarbon wells) can generally be understood as the fluid communication between the well and the formation. As this fluid communication is increased several enhancements or benefits may be obtained: the volume or rate of flow (e.g., gallons per minute) can increase; the distance within the formation out from the well where the natural resources will flow into the well can be increase (e.g., the volume and area of the formation that can be drained by a single well is increased, and it will thus take less total wells to recover the resources from an entire field); the time period when the well is producing resources can be lengthened; the flow rate can be maintained at a higher rate for a longer period of time; and combinations of these and other efficiencies and benefits.

Fluid communication between the formation and the well can be greatly increased by the use of hydraulic fracturing techniques. The first uses of hydraulic fracturing date back to the late 1940s and early 1950s. In general, hydraulic fracturing treatments involve forcing fluids down the well and into the formation, where the fluids enter the formation and crack, e.g., force the layers of rock to break apart or fracture. These fractures create channels or flow paths that may have cross sections of a few micron's, to a few millimeters, to several millimeters in size, and potentially larger. The fractures may also extend out from the well in all directions for a few feet, several feet and tens of feet or further. It should be remembered that the longitudinal axis of the well in the reservoir may not be vertical: it may be on an angle (either slopping up or down) or it may be horizontal. For example, in the recovery of shale gas and oil the wells are typically essentially horizontal in the reservoir. The section of the well located within the reservoir, i.e., the section of the formation containing the natural resources, can be called the pay zone.

Typical fluid volumes in the initial propped fracturing treatment of a formation in general can range from a few thousand to a few million gallons. This initial hydraulic fracturing operation can have several phases, each having different volumes of fluids, pressures and amounts of proppant. These initial propped fracturing treatments take place during the competition phase of the well, before or as it goes "on line" to become a producing well. Although in other types of completions the wells may only be hydraulically fractured and no proppant is used. In general, the objective of hydraulic fracturing is to create and enhance fluid communication between the wellbore and the hydrocarbons in the formation, e.g., the reservoir.

A significant and long standing problem with the present art is that very little actual, as opposed to inferential, information about the rate, shape and position of the fractures, and in particular the actual rate, shape and position of the fractures with respect to the well bore, the perforation, and the formation, can be determined. While individual seismic techniques have seen many great advances, such as micro seismic technology, and active seismic technology, they have still not been able to obtain this important actual information about fractures.

The fluids used to perform the initial hydraulic fracture, i.e., during the completion phase, can range from very simple, e.g., water, to very complex. Additionally, these fluids, e.g., fracing fluids or fracturing fluids, typically carry with them proppants; but not in all cases, e.g., when acids are used to fracture carbonate formations. Proppants are small particles, e.g., grains of sand, aluminum shot, sintered bauxite, ceramic beads, resin coated sand or ceramics, that are flowed into the fractures and hold, e.g., "prop" or hold open the fractures when the pressure of the fracturing fluid is reduced and the fluid is removed to allow the resource, e.g., hydrocarbons, to flow into the well.

In this manner the proppants hold open the fractures, keeping the channels open so that the hydrocarbons can more readily flow into the well. Additionally, the proppants greatly increase the surface area from which the hydrocarbons can flow into the well. Proppants may not be needed, or generally may not be used when acids are used to create a frac and subsequent channel in a carbonate rich reservoir, where the acids dissolve part or all of the rock leaving an opening for the formation fluids to flow to the wellbore.

Related Art and Terminology

As used herein, unless specified otherwise, the terms "hydrocarbon exploration and production", "exploration and production activities", "E&P", and "E&P activities", and similar such terms are to be given their broadest possible meaning, and include surveying, geological analysis, well planning, reservoir planning, reservoir management, drilling a well, workover and completion activities, hydrocarbon production, flowing of hydrocarbons from a well, collection of hydrocarbons, secondary and tertiary recovery from a well, the management of flowing hydrocarbons from a well, and any other upstream activities.

As used herein, unless specified otherwise, the term "earth" should be given its broadest possible meaning, and includes, the ground, all natural materials, such as rocks, and artificial materials, such as concrete, that are or may be found in the ground.

As used herein, unless specified otherwise "offshore" and "offshore drilling activities" and similar such terms are used in their broadest sense and would include drilling activities on, or in, any body of water, whether fresh or salt water, whether manmade or naturally occurring, such as for example rivers, lakes, canals, inland seas, oceans, seas, such as the North Sea, bays and gulfs, such as the Gulf of Mexico. As used herein, unless specified otherwise the term "offshore drilling rig" is to be given its broadest possible meaning and would include fixed towers, tenders, platforms, barges, jack-ups, floating platforms, drill ships, dynamically positioned drill ships, semi-submersibles and dynamically positioned semi-submersibles. As used herein, unless specified otherwise the term "seafloor" is to be given its broadest possible meaning and would include any surface of the earth that lies under, or is at the bottom of, any body of water, whether fresh or salt water, whether manmade or naturally occurring.

As used herein, unless specified otherwise, the term "borehole" should be given it broadest possible meaning and includes any opening that is created in the earth that is substantially longer than it is wide, such as a well, a well bore, a well hole, a micro hole, a slimhole and other terms commonly used or known in the arts to define these types of narrow long passages. Wells would further include exploratory, production, abandoned, reentered, reworked, and injection wells. They would include both cased and uncased wells, and sections of those wells. Uncased wells, or section of wells, also are called open holes, or open hole sections. Boreholes may further have segments or sections that have different orientations, they may have straight sections and arcuate sections and combinations thereof. Thus, as used herein unless expressly provided otherwise, the "bottom" of a borehole, the "bottom surface" of the borehole and similar terms refer to the end of the borehole, i.e., that portion of the borehole furthest along the path of the borehole from the borehole's opening, the surface of the earth, or the borehole's beginning. The terms "side" and "wall" of a borehole should to be given their broadest possible meaning and include the longitudinal surfaces of the borehole, whether or not casing or a liner is present, as such, these terms would include the sides of an open borehole or the sides of the casing that has been positioned within a borehole. Boreholes may be made up of a single passage, multiple passages, connected passages, (e.g., branched configuration, fishboned configuration, or comb configuration), and combinations and variations thereof.

As used herein, unless specified otherwise, the term "advancing a borehole", "drilling a well", and similar such terms should be given their broadest possible meaning and include increasing the length of the borehole. Thus, by advancing a borehole, provided the orientation is not horizontal and is downward, e.g., less than 90°, the depth of the borehole may also be increased.

Boreholes are generally formed and advanced by using mechanical drilling equipment having a rotating drilling tool, e.g., a bit. For example, and in general, when creating a borehole in the earth, a drilling bit is extending to and into the earth and rotated to create a hole in the earth. To perform the drilling operation the bit must be forced against the material to be removed with a sufficient force to exceed the shear strength, compressive strength or combinations thereof, of that material. The material that is cut from the earth is generally known as cuttings, e.g., waste, which may be chips of rock, dust, rock fibers and other types of materials and structures that may be created by the bit's interactions with the earth. These cuttings are typically removed from the borehole by the use of fluids, which fluids can be liquids, foams or gases, or other materials know to the art.

The true vertical depth ("TVD") of a borehole is the distance from the top or surface of the borehole to the depth at which the bottom of the borehole is located, measured along a straight vertical line. The measured depth ("MD") of a borehole is the distance as measured along the actual path of the borehole from the top or surface to the bottom. As used herein unless specified otherwise the term depth of a borehole will refer to MD. In general, a point of reference may be used for the top of the borehole, such as the rotary table, drill floor, well head or initial opening or surface of the structure in which the borehole is placed.

As used herein, unless specified otherwise, the term "drill pipe" is to be given its broadest possible meaning and includes all forms of pipe used for drilling activities; and refers to a single section or piece of pipe. As used herein the terms "stand of drill pipe," "drill pipe stand," "stand of pipe," "stand" and similar type terms should be given their broadest possible meaning and include two, three or four sections of drill pipe that have been connected, e.g., joined together, typically by joints having threaded connections. As used herein the terms "drill string," "string," "string of drill pipe," string of pipe" and similar type terms should be given their broadest definition and would include a stand or stands joined together for the purpose of being employed in a borehole. Thus, a drill string could include many stands and many hundreds of sections of drill pipe.

As used herein, unless specified otherwise, the terms "workover," "completion" and "workover and completion" and similar such terms should be given their broadest possible meanings and would include activities that take place at or near the completion of drilling a well, activities that take place at or the near the commencement of production from the well, activities that take place on the well when the well is a producing or operating well, activities that take place to reopen or reenter an abandoned or plugged well or branch of a well, and would also include for example, perforating, cementing, acidizing, fracturing, pressure testing, the removal of well debris, removal of plugs, insertion or replacement of production tubing, forming windows in casing to drill or complete lateral or branch wellbores, cutting and milling operations in general, insertion of screens, stimulating, cleaning, testing, analyzing and other such activities.

As used herein, unless specified otherwise, the terms "formation," "reservoir," "pay zone," and similar terms, are to be given their broadest possible meanings and would include all locations, areas, and geological features within the earth that contain, may contain, or are believed to contain, hydrocarbons.

As used herein, unless specified otherwise, the terms "field," "oil field" and similar terms, are to be given their broadest possible meanings, and would include any area of land, sea floor, or water that is loosely or directly associated with a formation, and more particularly with a resource containing formation, thus, a field may have one or more exploratory and producing wells associated with it, a field may have one or more governmental body or private resource leases associated with it, and one or more field(s) may be directly associated with a resource containing formation.

As used herein, unless specified otherwise, the terms "conventional gas", "conventional oil", "conventional", "conventional production" and similar such terms are to be given their broadest possible meaning and include hydrocarbons, e.g., gas and oil, that are trapped in structures in the earth. Generally, in these conventional formations the hydrocarbons have migrated in permeable, or semi-permeable formations to a trap, or area where they are accumulated. Typically, in conventional formations a non-porous layer is above, or encompassing the area of accumulated hydrocarbons, in essence trapping the hydrocarbon accumulation. Conventional reservoirs have been historically the sources of the vast majority of hydrocarbons produced. As used herein, unless specified otherwise, the terms "unconventional gas", "unconventional oil", "unconventional", "unconventional production" and similar such terms are to be given their broadest possible meaning and includes hydrocarbons that are held in impermeable rock, and which have not migrated to traps or areas of accumulation.

As used herein, unless stated otherwise, room temperature is 25° C. And, standard temperature and pressure is 25° C. and 1 atmosphere. As used herein, unless stated otherwise, generally, the term "about" is meant to encompass a variance or range of ±10%, the experimental or instrument error associated with obtaining the stated value, and preferably the larger of these.

As used herein, unless stated otherwise, the terms "active seismic", "active analysis", "active imaging" and similar such terms are to be given their broadest possible meaning, and would include all imaging systems that rely upon, or utilize, a source of imaging medium, and an imaging media, that is in addition to or separate from the object or target being imaged. Thus, for active seismic there is a source of seismic waves that creates the seismic waves which travel through and reflected by the target, e.g., the well bore and formation or area around the well bore, and are then detected by sensors, which provides data or information for analysis.

As used herein, unless stated otherwise, the terms "passive seismic", "passive analysis", "passive imaging" and similar such terms are to be given their broadest possible meaning, and would include all imaging systems that rely upon, or utilize, imaging medium that is coming from, or created by, the object or target being imaged. Thus, for passive seismic, such as micro-seismic, the target, e.g., fracture propagation, the fracture being created during hydraulic fracturing, provides the seismic waves that are then detected by sensors, which provides data or information for analysis.

As used herein unless specified otherwise, the recitation of ranges of values herein is merely intended to serve as a shorthand method of referring individually to each separate value falling within the range. Unless otherwise indicated herein, each individual value within a range is incorporated into the specification as if it were individually recited herein.

This Background of the Invention section is intended to introduce various aspects of the art, which may be associated with embodiments of the present inventions. Thus, the forgoing discussion in this section provides a framework for better understanding the present inventions, and is not to be viewed as an admission of prior art.

SUMMARY

There has been a long-standing, expanding and unmet need, for high definition, detailed images and information about the earth and activities and structures within the earth. In particular, this need has been long felt, increasing, and unmet in the exploration and production of resources, such as hydrocarbons and geothermal energy. Thus, there exists a long felt, increasing and unfulfilled need for, among other things, systems and methods for imaging subterranean features and objects, and including in particular, hydraulic fracturing and the production of hydrocarbons from shale extending the useful life of wells, reducing the rate of decline in a well, and increasing the total production obtained from wells. The present inventions, among other things, solve these needs by providing the articles of manufacture, devices and processes taught, and disclosed herein.

There is provided a method of obtaining enhanced images of subterranean features, the method including: acquiring a first signal with a first sensor array; acquiring a second signal with a second sensor array; processing the first signal whereby the location of sensors on the second sensor array is utilized as part of the processing; processing the second signal; migrating the processes first and second signals together; whereby a detailed image of the feature and its position are determined.

Further, there is provided these methods, systems and images having one or more of the following features: wherein the first and second signals are the same; wherein the first and second signals are different; wherein the first and second signals are spaced apart in time; and wherein the first signal is a passive signal.

Additionally, there is provided a method of providing highly accurate images of hydraulic fractures in relation to a well located in a formation within the earth, the method including: obtaining a plurality of seismic source events; wherein the plurality of source events defines a first area, the first area having a known location with respect to at least one of the formation, the well or a structure of the well; creating a first 2-D map of seismic information, wherein the map comprises upward and down ward reflections relative to a location of a source event in the area; creating a second 2-D map of seismic information, wherein the map comprises upward and down ward reflections relative to a location of a source event in the area; wherein the second 2-D map is different than the first 2-D map; creating a third 2-D map of seismic information, wherein the map comprises upward and down ward reflections relative to a location of a source event in the area; wherein the third 2-D map is different than the first 2-D map and the second 2-D map; combining the first, the second and the third 2-D map to create a 3-D volume, the 3-D volume defining a shape and having a known location with respect to the formation, the well and to a structure of the well; and processing the 3-D volume to obtain an image of a fracture, the image defining a shape of the fracture and having a known location with respect to at least one of the formation, the well or the structure in the well.

Further, there is provided these methods, systems and images having one or more of the following features: wherein the structure of the well is the well heel; wherein the structure of the well is a perforation; wherein the first area has a known location with respect to the well and the structure of the well; wherein the image of the fracture has a known location with respect to the well; wherein the image of the fracture has a known location with respect to the structure of the well; wherein the image of the fracture has a known location with respect to the formation, the well and the structure of the well; wherein the first, the second and third 2-D maps each are based upon a different source event; wherein the first, the second and the third 2-D maps are each based upon the same source event; wherein at least one of the first, the second or the third 2-D maps are based upon a different source event from the others; wherein the fracture is a hydraulic fracture; wherein the fracture is a naturally occurring fracture; wherein the image of the fracture has a known location with respect to the structure of the well; wherein the image of the fracture has a known location with respect to the formation, the well and the structure of the well; wherein the first, the second and third 2-D maps each are based upon a different source event; further comprising the step of using the image of the fracture to perform an oil filed operation; and wherein the oil field operation is selected from the group consisting of drilling, perforating, hydraulic fracturing, workover, and completion.

Yet further, there is provided a method of providing highly accurate images of hydraulic fractures in relation to a well located in a formation within the earth, the method including: obtaining a plurality of seismic source events; wherein the plurality of source events defines a first area, the first area having a known location with respect to at least one of the formation, the well or a structure of the well; creating a first 2-D map of seismic information, wherein the map comprises upward and down ward reflections relative to a location of a source event in the area; creating a second 2-D map of seismic information, wherein the map comprises upward and down ward reflections relative to a location of a source event in the area; wherein the second 2-D map is different than the first 2-D map; creating a third 2-D map of seismic information, wherein the map comprises upward and down ward reflections relative to a location of a source event in the area; wherein the third 2-D map is different than the first 2-D map and the second 2-D map; combining the first, the second and the third 2-D map to create a 3-D volume, the 3-D volume defining a shape and having a known location with respect to the formation, the well and to a structure of the well; and, processing the 3-D volume to obtain an image of a near well bore feature, the image defining a shape of the feature and having a known location with respect to at least one of the formation, the well or the structure in the well.

Additionally, there is provided these methods, systems and images having one or more of the following features: wherein the near well bore feature comprises a fracture; wherein the near well bore feature comprises a naturally occurring fracture; wherein the near well bore feature comprises a hydraulic fracture; wherein the near well bore feature comprises a damaged section of the well; wherein the near well bore feature comprises plug extending into the formation; wherein the near well bore feature comprises a defect in the integrity of the well; wherein the near well bore feature extends from adjacent to the well to at least about 10 feet from the well; wherein the near well bore feature extends from adjacent to the well to at least about 30 feet from the well; wherein the near well bore feature extends from adjacent to the well to at least about 50 feet from the well; wherein the near well bore feature extends from adjacent to the well comprising a distance of about 10 feet from the well; wherein the near well bore feature extends from adjacent to the well comprising a distance of about 30 feet from the well; wherein the near well bore feature extends from adjacent to the well comprising a distance of about 50 feet from the well; wherein the image identifies the near well bore feature with an accuracy selected from the group consisting of: within in about 3 feet to about ¼ inch, within 2 feet or less, within 1 foot or less, within 6 inches or less, and within 1 inch or less, of the actual location; and, wherein the image identifies the shape of the near well bore feature with an accuracy selected from the group consisting of: about 80% to 99%, greater than 80%, greater than 85%, greater than 90%, greater than 95%, and greater than 98%, of the actual shape.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF THE PREFERRED EMBODIMENTS

Figure 1A:
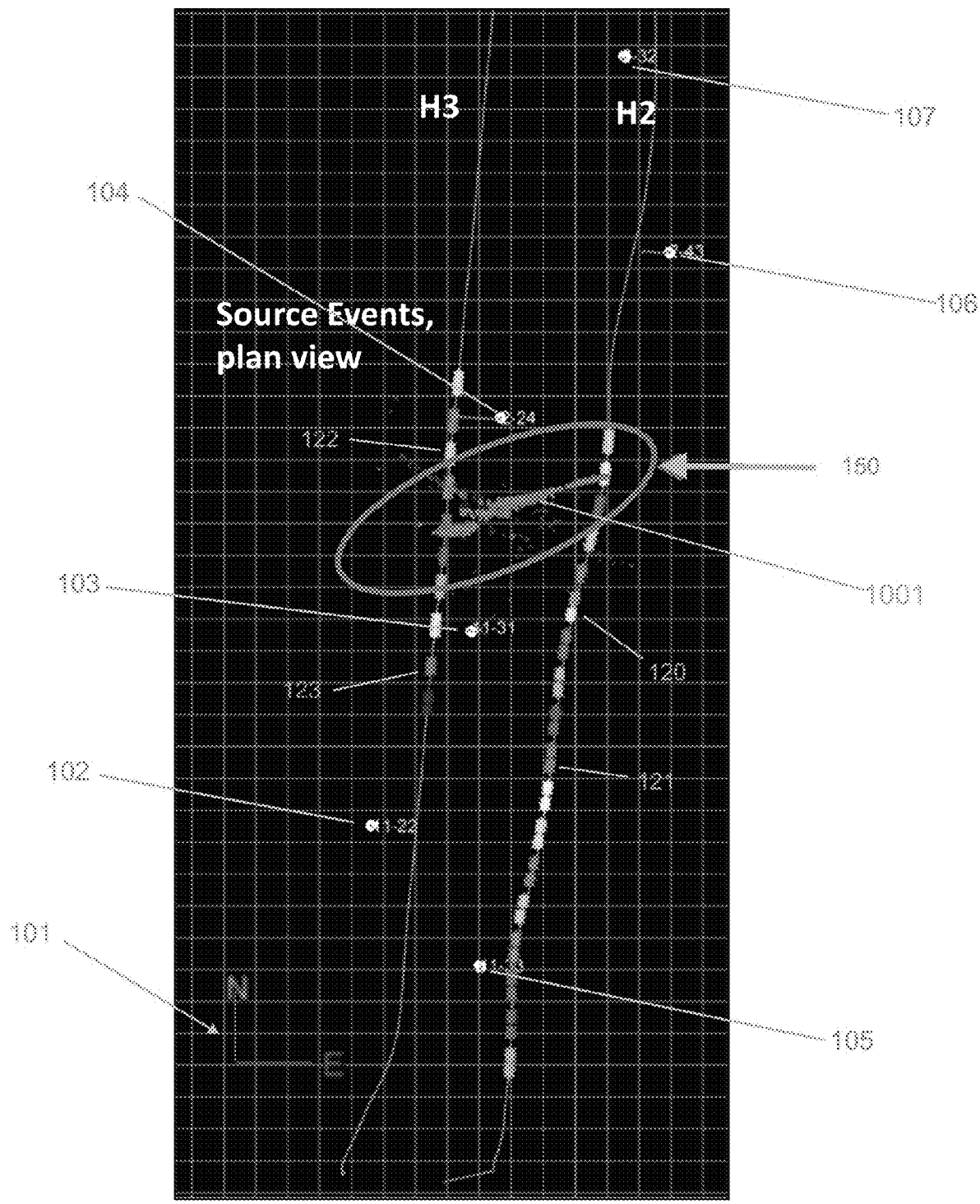
FIG. 1A is a plan view illustration of an embodiment of a system for obtaining and representations of source events, in accordance with the present inventions.

The present inventions generally relate to systems, methods and operations to enhance imaging and data collection by combining multiple sensing techniques in a manner that creates synergistic images and data, which provides actual information about the imaged target in such detail that was unobtainable by prior imaging and data acquisition technologies. In an embodiment, two different types of seismic information are combined in a unique and novel manner to provide an enhanced, high definition image and information about the target including such information about the shape, rate of change, position and location of the target.

In general, in an embodiment of the present invention a first detector system and a second detector system are associated with a borehole that is intended to be, or is, a producing well, e.g., a well where a resource is to be recovered. The first detector system and the second detector systems receive different signals from the same target or source, e.g., a perforation, a fracture or both. The difference in the signal can be, for example: type of signal, e.g., acoustic vs electromagnetic; wavelength; frequency; timing or duration; distance from the source; number of detectors; and combinations and variation of these and other differences. The differences in these signals, among other things, when combined provides for the enhanced data and images.

While this specification focusses on an embodiment having a first and a second detector system, it is understood that the present inventions are not so limited. Thus, embodiments can have three, four, five, ten or more detector systems, and can have these systems spread out, or otherwise distributed throughout multiple wells in an oil field. Similarly, while this specification focusses on applications for the recovery of hydrocarbons and geothermal energy, it is understood that the present inventions are not so limited and have applications in other areas, such as: bridge and dam foundation analysis; building and structure analysis; in situ material testing; soil and rock mechanics; earthquake engineering; liquefaction analysis; mapping of stratigraphy, structure and hydrogeology; mapping of faults, bedrock; mapping ground water; mapping landsides; level analysis; and landfill investigations, to name a few.

The first sensing or detector system has detectors (e.g., sensors, acquisition boxes, optical fiber sections, etc.) that are located at a set position (e.g., a known or predetermined position) with respect to the producing well's wellbore. The first sensing system detectors can be located in the producing well's wellbore, adjacent to that wellbore, along a casing or other tubular forming that wellbore, or preferably in, or associated with an adjacent monitoring well, which could be solely for monitoring purposes or could also be a producing well itself. The detectors in the first sensing system can be spaced evenly, in a predetermined pattern, or at different intervals, along the length of the wellbore, or section of the wellbore, being monitored. The length of the detectors, e.g., a monitoring section, or string for the collection of detectors making up the sensing system, can be about 10 ft to about 2,000 ft in length, about 100 ft to about 1,000 ft, about 100 ft to about 2,000 ft, about 100 ft to about 500 ft, greater than 100 ft, greater than 500 ft, and greater and lesser distances, as well as all distances within these ranges. The detectors can be separated by about 5% of the length of the monitoring section, about 10% of the length of the monitoring section, about 15% of the length of the monitoring section, the detectors can be separated by about 0.5 ft, about 1 ft, about 5 ft, about 10 ft, about 15 ft, about 20 ft, about 50 ft, from about 5 ft to about 20 ft, by less than 100 ft, less than 50 ft, and greater and lesser distances, as well as all distances within these ranges.

The second sensing or detector system has detectors (e.g., sensors, acquisition boxes, optical fiber sections, etc.) that are located at a set position (e.g., a known or predetermined position) with respect to the producing well's wellbore. The second sensing system detectors can be located in the producing well's wellbore, adjacent to that wellbore, along a casing or other tubular forming that wellbore, or preferably in, or associated with an adjacent monitoring well, which could be solely for monitoring purposes or could also be a producing well itself. The detectors in the second sensing system can be spaced evenly, in a predetermined pattern, or at different intervals, along the length of the wellbore, or section of the wellbore, being monitored. The length of the detectors, e.g., a monitoring section, or string for the collection of detectors making up the sensing system, can be about 10 ft to about 2,000 ft in length, about 100 ft to about 1,000 ft, about 100 ft to about 2,000 ft, about 100 ft to about 500 ft, greater than 100 ft, greater than 500 ft, and greater and lesser distances, as well as all distances within these ranges. The detectors can be separated by about 5% of the length of the monitoring section, about 10% of the length of the monitoring section, about 15% of the length of the monitoring section, the detectors can be separated by about 0.5 ft, about 1 ft, about 5 ft, about 10 ft, about 15 ft, about 20 ft, about 50 ft, from about 5 ft to about 20 ft, by less than 100 ft, less than 50 ft, and greater and lesser distances, as well as all distances within these ranges.

The first, the second, the third, etc., or one, two or all, sensing systems can be systems presently known or later developed to sense or detect signals regarding objects, structures, characterizations, properties and combinations and variations of these, in particular, for objects, formations, structures, characterizations, and properties below the surface of the earth. The sensing systems can be based upon acoustic waves, electromagnetic waves, electromagnetic particles, and combinations and variations of these. The sensing systems can be a passive system, an active system and combinations and variations of these. By way of example the sensing systems can use geophones as detectors, optical fibers as detectors, and combinations and variations of these. By way of example, the sensing systems can be based in whole or part upon, or characterized as: seismic refraction; seismic reflection; surface wave analysis; downhole seismic; micro-seismic; crosshole seismic; capacitively-coupled resistivity; magnetotellurics; time-domain EM; and Manetometry; to name a few.

Fiber optic sensing systems can be any system currently known.

Geophone sensing systems can be any system currently known.

In a preferred embodiment the first and second sensor systems are located adjacent one and other, and in a monitoring well. The monitoring well can be about 100 ft to about 500 ft, at least about 50 ft, at least about 100 ft at least about 200 ft, not more than about 1,000 ft, and greater and lesser distances as well as all distances in these ranges. Generally, the distance should be a distance where the signals for both the first and second sensor can be received and interpreted by the detectors. The spacing of the detectors on the first and second systems should be such as to provide the requisite level of differentiation and resolution to obtain good data and images for each system.

The signals that are received by the detectors on the first system and the signals that are received by the detectors on the second system and converted into data that is transmitted along the system (e.g., the optical fiber and wireline.

In an embodiment of an enhanced imaging systems information obtained from micro-seismic monitoring of fracture propagation is migrated to information obtained from geophone seismic analysis of the well. It being understood that migration of active seismic analysis to passive seismic analysis is also contemplated. The passive seismic information provides great details, high resolution, and a large volume of information about the fracture propagation. This information, however, is unbounded. By unbounded it is meant that the information is not tied well, and typically not tied, to a precise location in the formation with respect to the well. Thus, prior to the present inventions, this information has not been able to provide the actual position, shape and rate of fracture of the fracture tied to a precise location in the formation and within the well. To overcome this failing of passive seismic techniques, the present inventions using a second seismic imaging (active or passive or both) to provide information about the location of the well, features of the formation, and the location of the passive seismic sensors. The detailed passive seismic information is then migrated over the location and position information of the second source of seismic data. This migration, or composite information, can then be further processed. The resulting composite image, or information, from this migration of passive information to second source provides a high definition image, or data of the location, position and rate of the fracture.

In embodiments, there is provided a high definition image (graphic depiction) of a hydraulic fracture that identifies the location of the fracture with respect to the wellbore within about 3 feet to about ¼ inch, within 2 feet or less, within 1 foot or less, within 6 inches or less, within 1 inch or less, of the actual location, and greater and lesser distances and all distances within these ranges.

In embodiments, there is provided a high definition image (graphic depiction) of a hydraulic fracture that identifies the location of the fracture with respect to the formations, and identified or known features of the formation, within in about 3 feet to about ¼ inch, within 2 feet or less, within 1 foot or less, within 6 inches or less, within 1 inch or less, of the actual location, and greater and lesser distances and all distances within these ranges.

In embodiments, there is provided a high definition image (graphic depiction) that has detailed information about the shape (preferably including volume) of the fracture, this information has an accuracy of about 80% to 99%, greater than 80%, greater than 85%, greater than 90%, greater than 95%, greater than 98%, of the actual shape of the fracture, and greater and lesser distances and all distances within these ranges. In embodiments, this information is obtained from a passive source, and In embodiments, there is provided a high definition image (graphic depiction) that has detailed information about the fracturing rate, the movement of the fracturing fluid, the movement of the proppant, the closing of the fracture, and combinations and variations of these, this information has an accuracy of about 80% to 99%, greater than 80%, greater than 85%, greater than 90%, greater than 95%, greater than 98%, of the actual rates, and greater and lesser rates and all rates within these ranges.

In embodiments, the underlying high definition information of the image is presented or used in other processes, media and tools.

In a preferred embodiment the images, the underlying data, and both for the fracture are migrated over the images, the underlying data, and both, to provide a high definition (having the accuracies of each of the forgoing) and thus providing both high definition shape, rate and location information and images.

Although the majority of this specification focusses on embodiments of restimulation operations for unconventional hydrocarbon (e.g., shale oil and natural gas) containing formations and reservoirs, it should be understood that this is only by way of a preferred embodiment. Embodiments of the present restimulation operations my find applications and provide benefits in conventional wells and formations, in other types of hydrocarbon containing formations, on land and subsea, and geothermal applications, as well as, in the extraction of ores, gems and minerals from the earth.

Figure 1B:
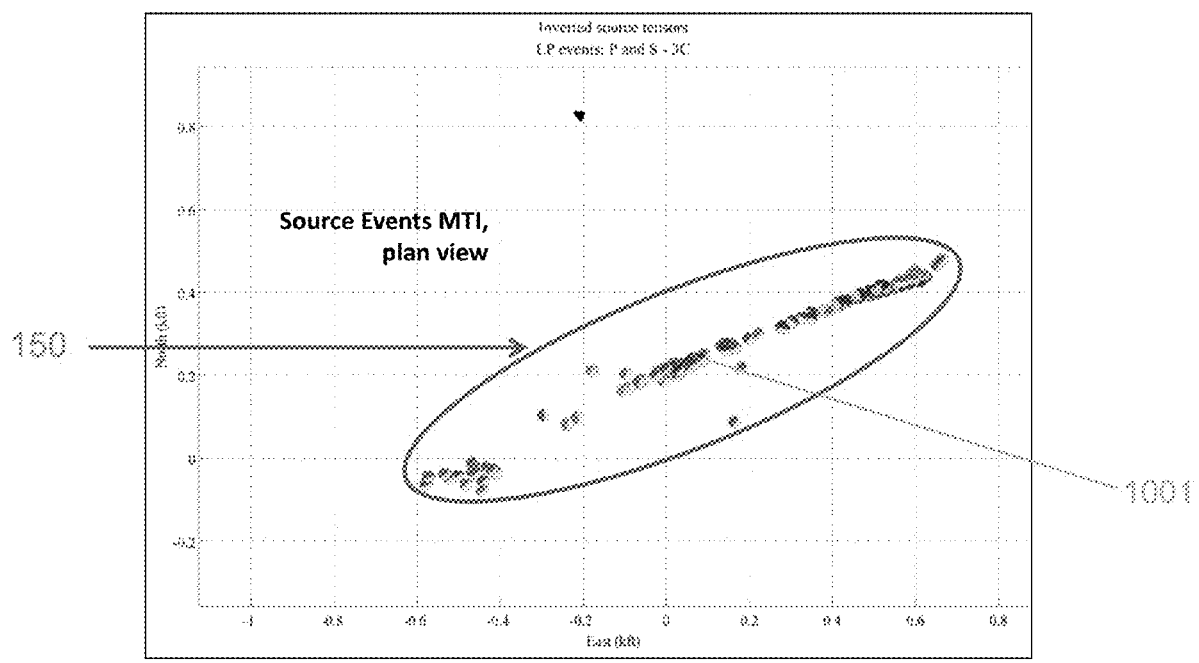
FIG. 1B is an enlarged view of area 150 of FIG. 1A.
Figure 2:
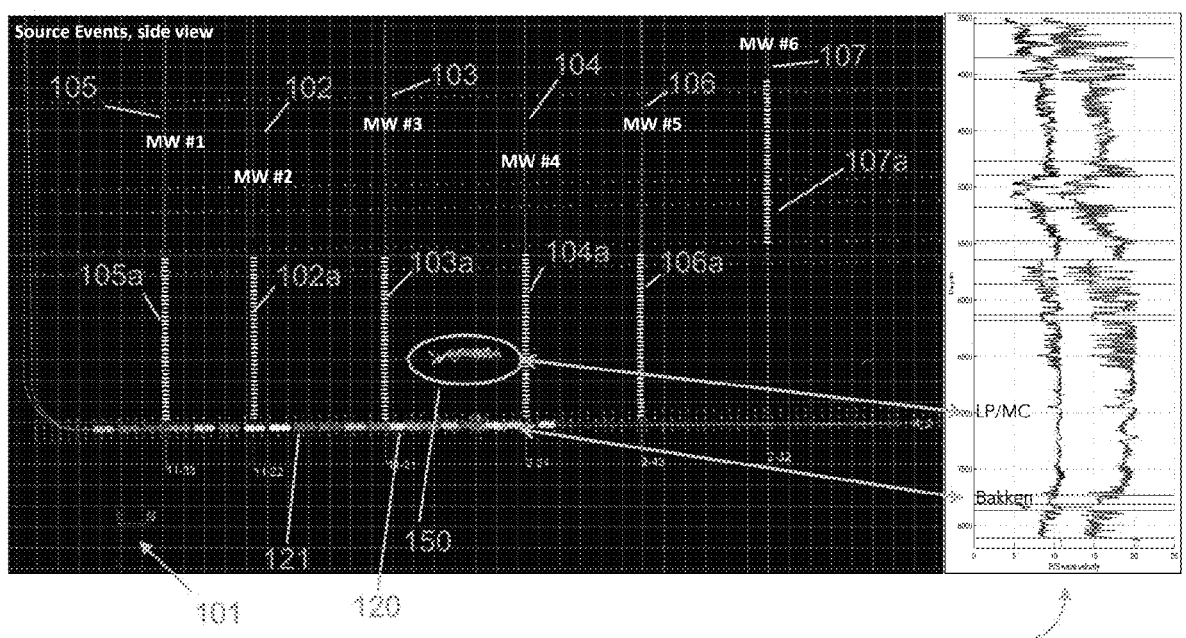
FIG. 2 is a side view of the embodiment of FIG. 1A

Turning to the embodiment of the system and method that is illustrated by the Figures. FIGS. 1A, 1B and 2 generally relate to acquisition and identification of source events. FIGS. 3A, 3B, 4 and 4A-4E generally relate to reflection acquisition mapping, imaging intervals and building volumes from these. FIGS. 5-8 generally relate to mapping the migrating data to the well and formation from the build volumes from FIGS. 3A through 4E. FIGS. 9-11B generally relate to the extraction of fault information from the migrated data and creating a visualization, or images of fractures and that includes the relative locations of those fractures. Throughout the figures, like numbers indicate like structures or items, unless expressly stated otherwise.

Turning to FIG. 1A, FIG. 1B and FIG. 2 there is shown an embodiment having two hydrocarbon wells H3 and H2 and six measuring wells. FIGS. 1A and 1B are plan views and FIG. 2 is a side view. The orientation of the wells is shown by the compass settings 101. There are six measuring wells ("MW #) 102, 103, 104, 105, 106, 107 that each have several sensing devices, e.g., 102a, 103a, 104a, 105a, 106a, 107a, spread along the particular length of each of the measuring wells. The wells H2 and H3 each have a series of perforations along their length. Perforations are shown as color stars, e.g., 122, 123, along the horizontal length of well H3; and, perforations shown as color stars, e.g., 120, 121, along the horizontal length of well H2. Information obtained by the sensors in the measuring wells, provides over 600 source events, e.g., 1001, that are located in area 150. The moment tensor inversion ("MTI") for area 150 indicates that events share similar focal mechanism, which is dominated by double couple dip-slip plus slight opening-mode at the tips of the event cloud. FIG. 1B is an enlarged and isolated plan view of event area 150. The orientation of the view is the same as in FIG. 1A.

FIG. 2 is a side view of the embodiment of FIGS. 1A and 1B. In FIG. 2 the area 150 and the wells (well H2 is the foreground, and well H3 is in the background, both being at about the same depth) are referenced to, or correlated with, depth and the P/S wave velocity plot 160.

Figure 3A:
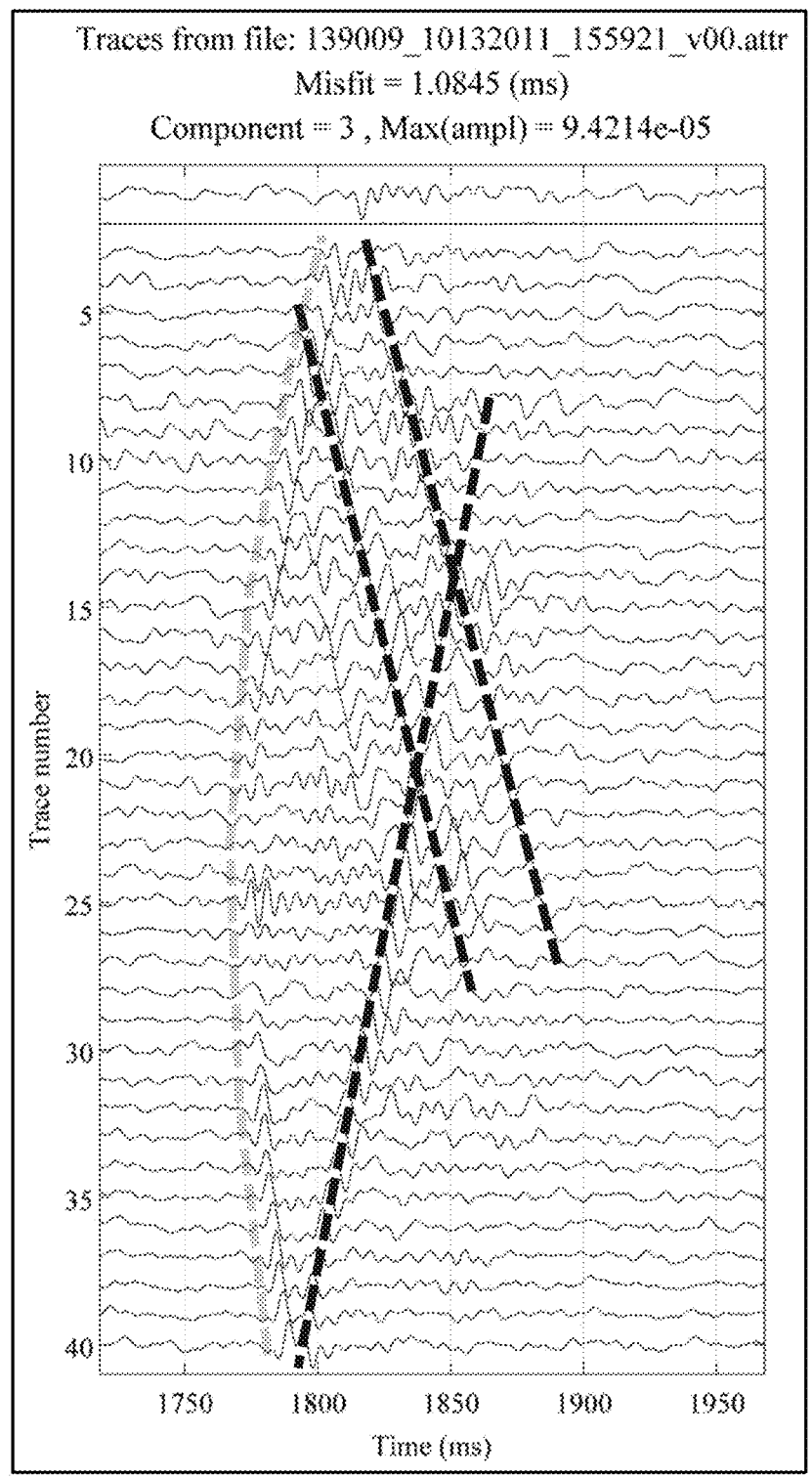
FIG. 3A is a data plot showing shows raw trace data of a seismic event, in accordance with the present inventions.
Figure 3B:
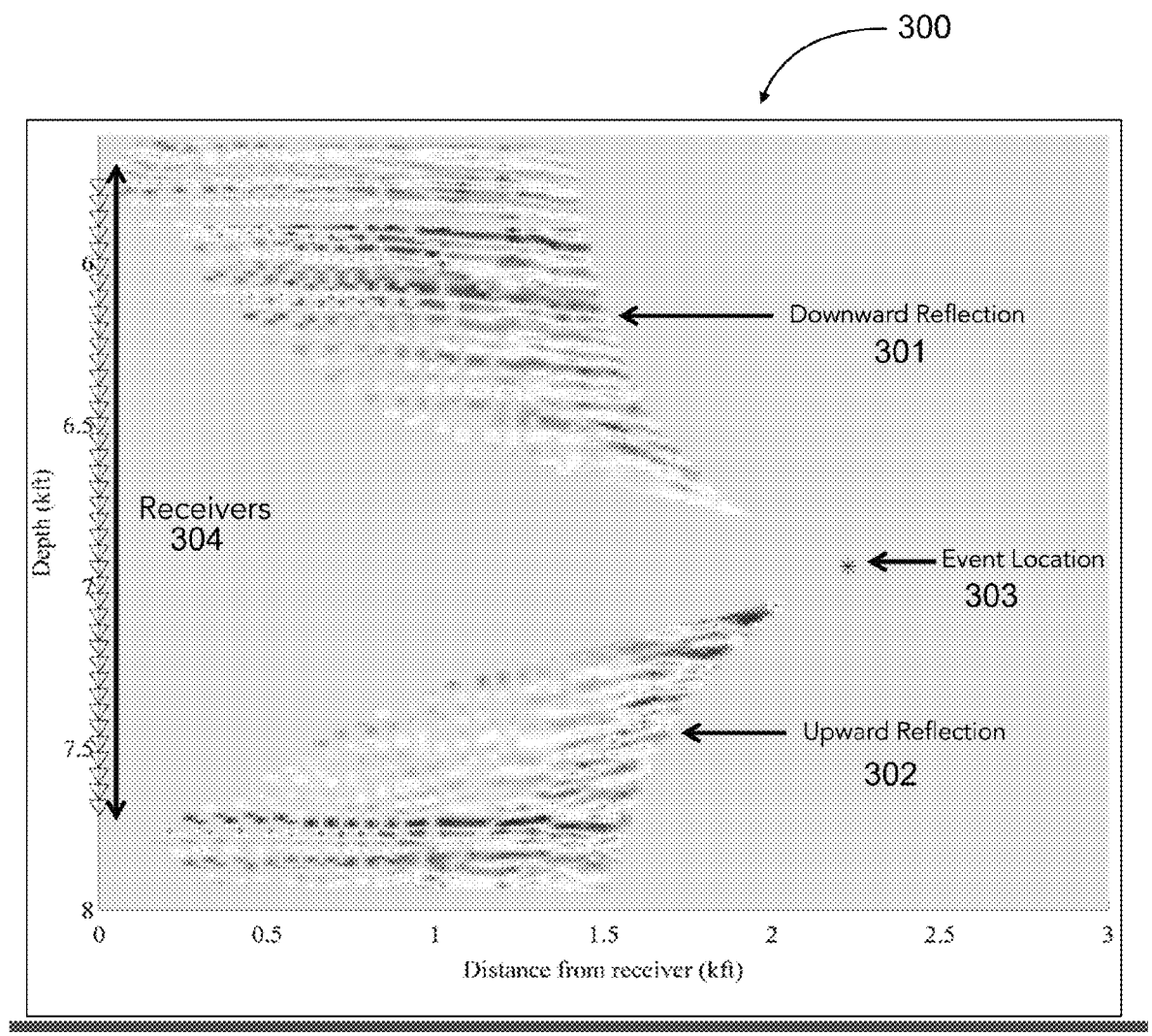
FIG. 3B is an embodiment of a 2-D slice reflection data map based upon the data of FIG. 3A mapped to the location of an event, in accordance with the present inventions.
Figure 4:
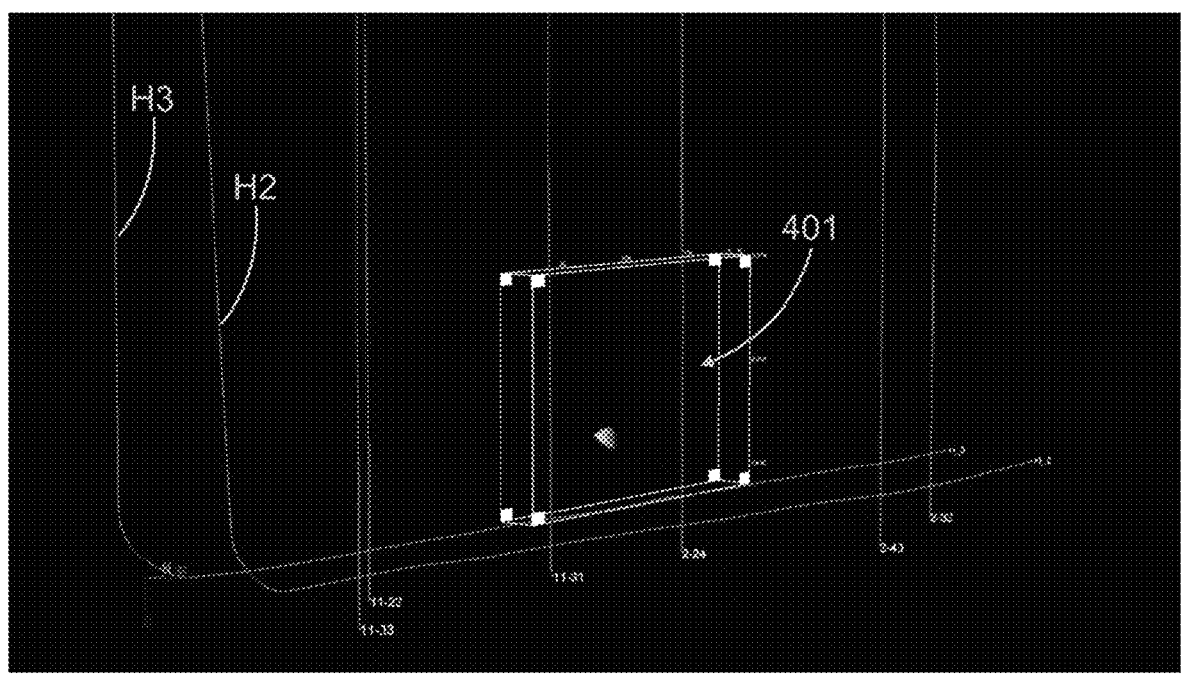
FIG. 4 is an illustration of an embodiment of a volume area, located with respect to wells, to be filed by mapped reflection data, in accordance with the present invention.
Figure 4A:
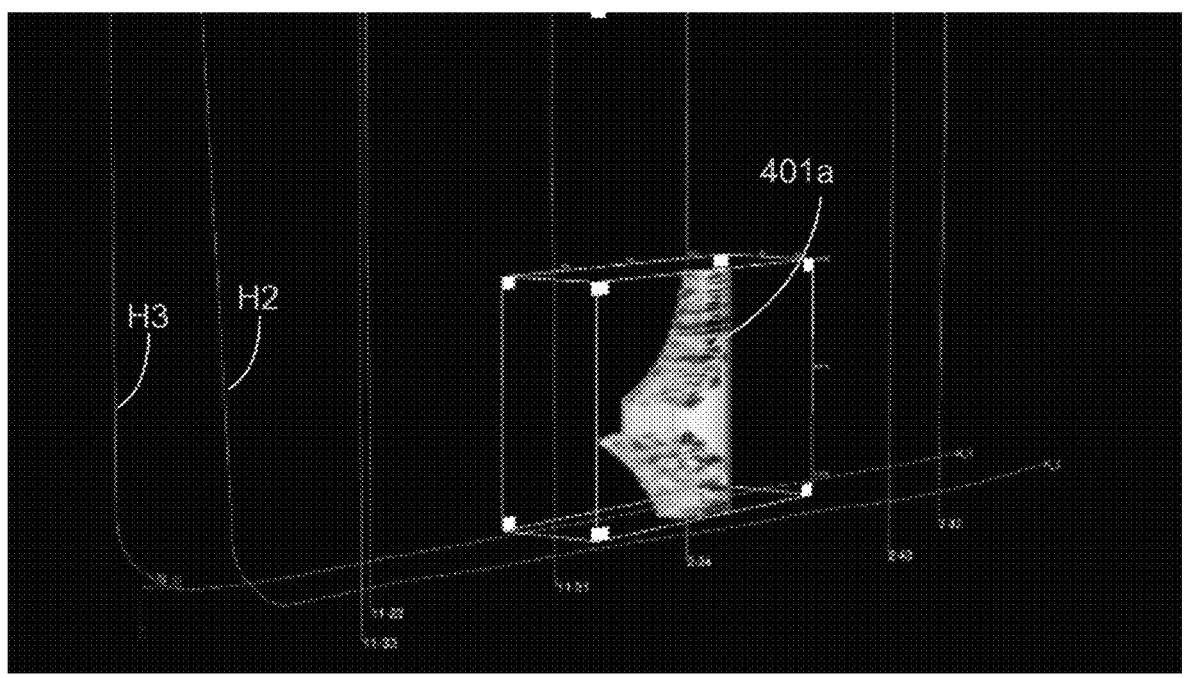
FIG. 4A is an illustration of the volume area of FIG. 4 being initially filed with mapped reflection data in accordance with the present inventions.
Figure 4B:
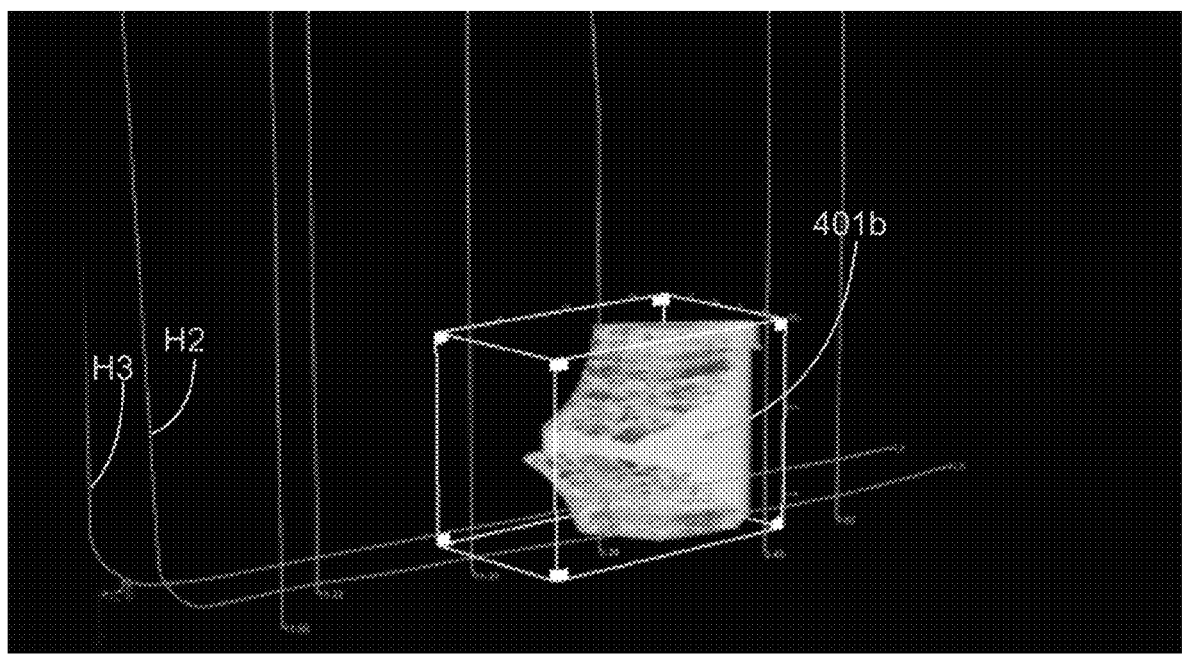
FIG. 4B is an illustration of volume of FIG. 4A being completely filled with mapped reflection data.
Figure 4C:
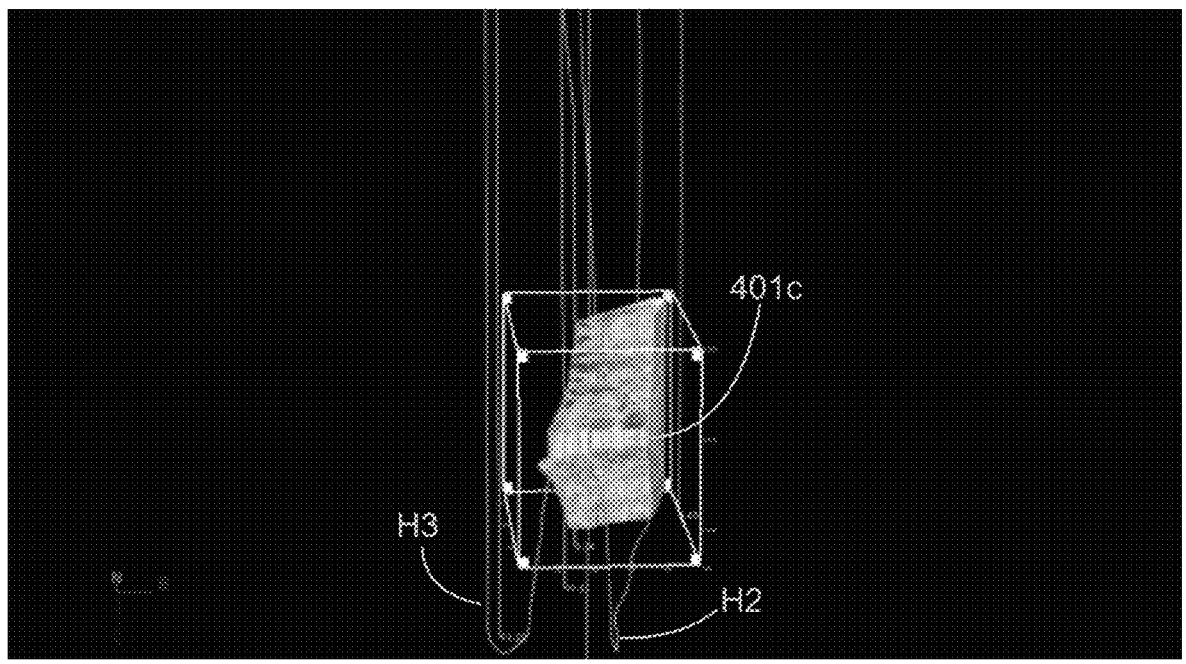
FIG. 4C is an illustration of the filled volume area of FIG. 4B being rotated about its vertical axis, in accordance with the present inventions.
Figure 4D:
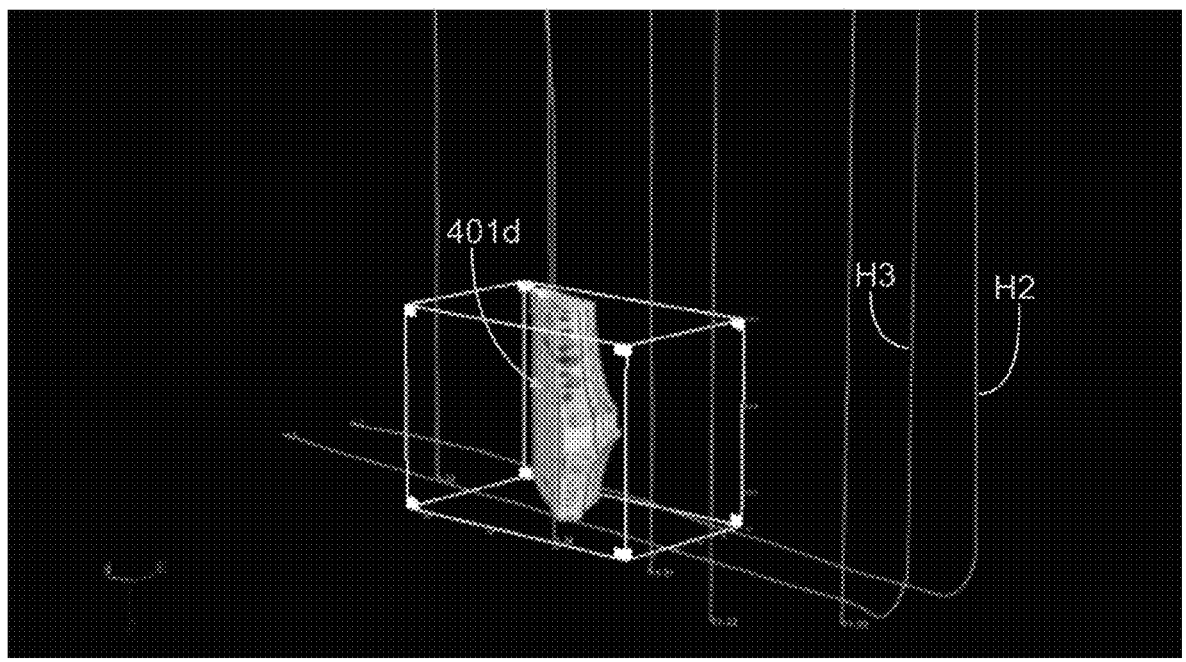
FIG. 4D is an illustration of the filled volume area of FIG. 4B being further rotated beyond the rotation shown in FIG. 4C, in accordance with the present inventions.
Figure 4E:
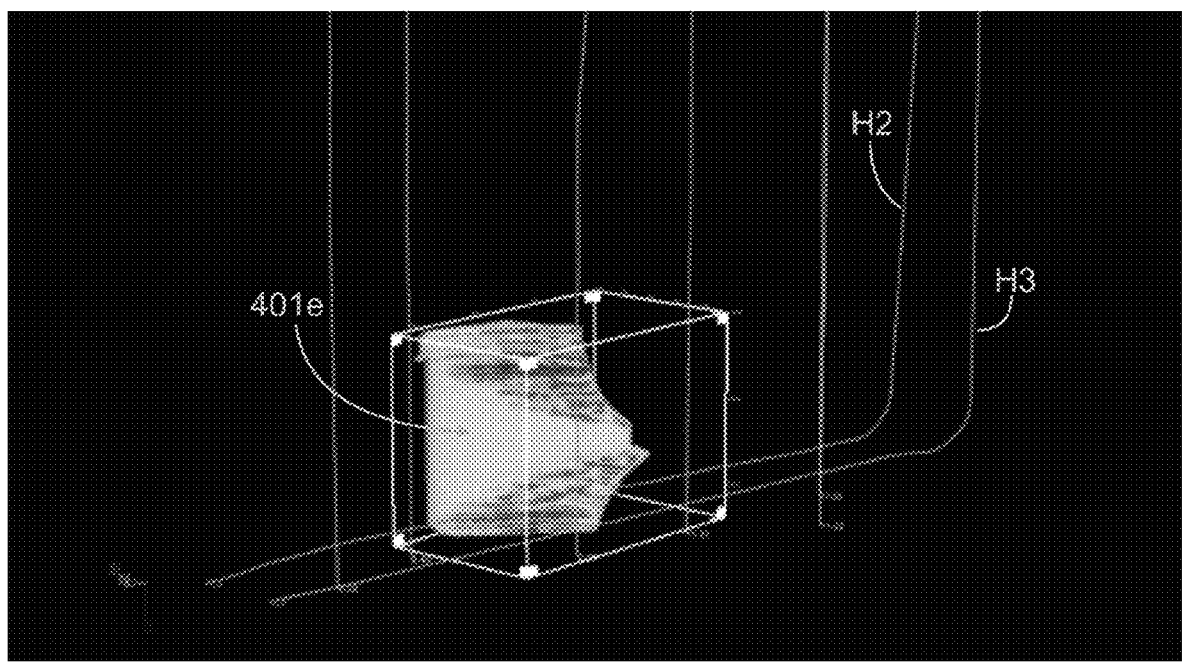
FIG. 4E is an illustration of the filled volume area of FIG. 4B being further rotated beyond the rotation shown in FIG. 4D, in accordance with the present inventions.

FIGS. 3A and 3B show a reflector mapping of a single microseismic event. FIG. 3A shows the raw trace data. FIG. 3B is an image of the raw trace data of FIG. 3A mapped into a single image slice 300. The slice image 300 has a downward reflection component 301, and an upward reflection component 302, that relate to an event 303. The images are shown in relation to the receivers, or sensors, 304 in a measuring well.

FIG. 4 and FIGS. 4A to 4E illustrates the building of single slices (such as from FIG. 3B) into a volume 401, 401a, 401b, 401c, 401d, 401e and then to rotate that volume, so that all sides are illustrated. Thus, images 401b-401e are the completed volumes that have been rotated so that different sides of the 3-D volume can be observed. In practice, for example, the volume and rotation can be rendered as a video, showing the build of the slices into a volume and then its rotation. The measuring wells are shown as vertical lines (green in color) but are not numbered. The measuring wells are the same wells as shown in FIGS. 1A, 1B and 2.

Figure 5:
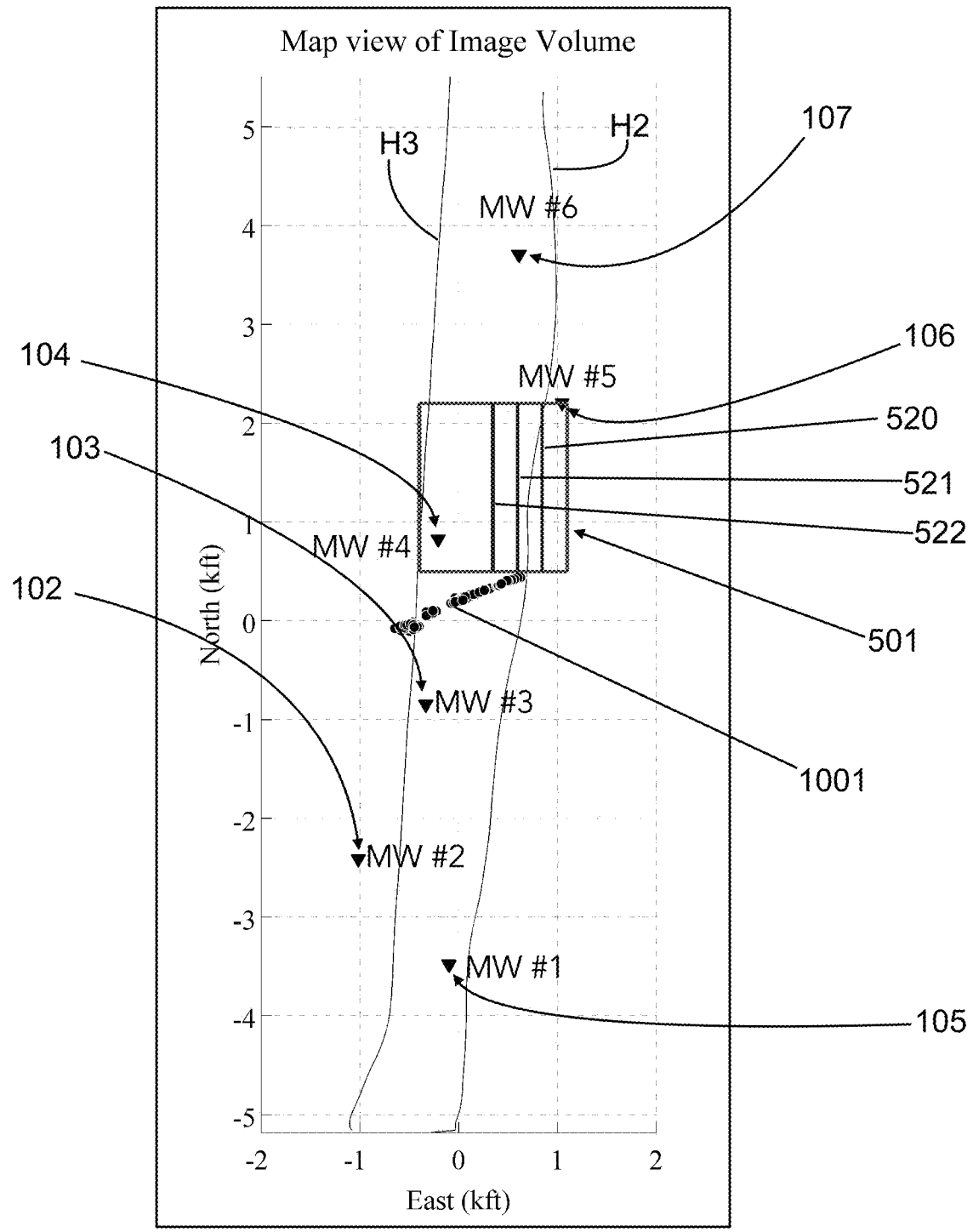
FIG. 5 is a plan view illustration showing the migration of the filled volume area of FIG. 4B migrated to well locations, in accordance with the present inventions.

FIG. 5 shows the migration the information to a higher resolution plan view of the wells. For this image information from MW #5 is used, with 97 of the strongest events having average traveltime misfit <1.5 ms being used. The square 501 indicates the location of the migration volume, and the lines 520, 521, 522, indicate the 2-D slices that were used to build the migration volume image.

Figure 6:
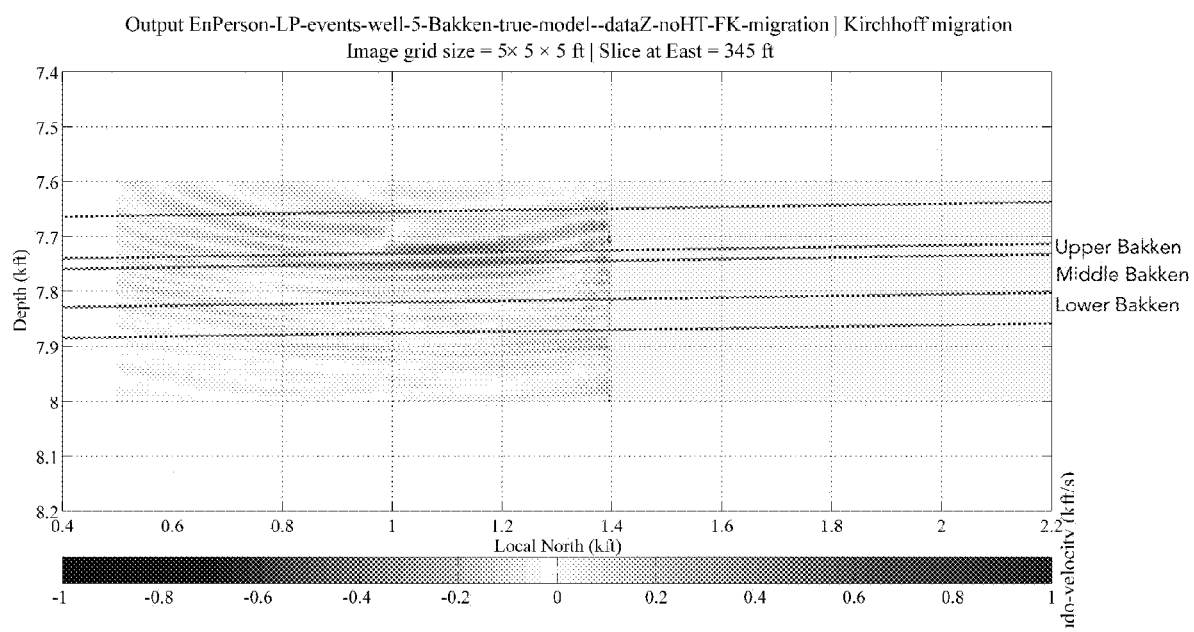
FIGS. 6, 7, and 8 are each illustrations of 2-D slice migrated data with respect to the formation, in accordance with the present invention.
Figure 7:
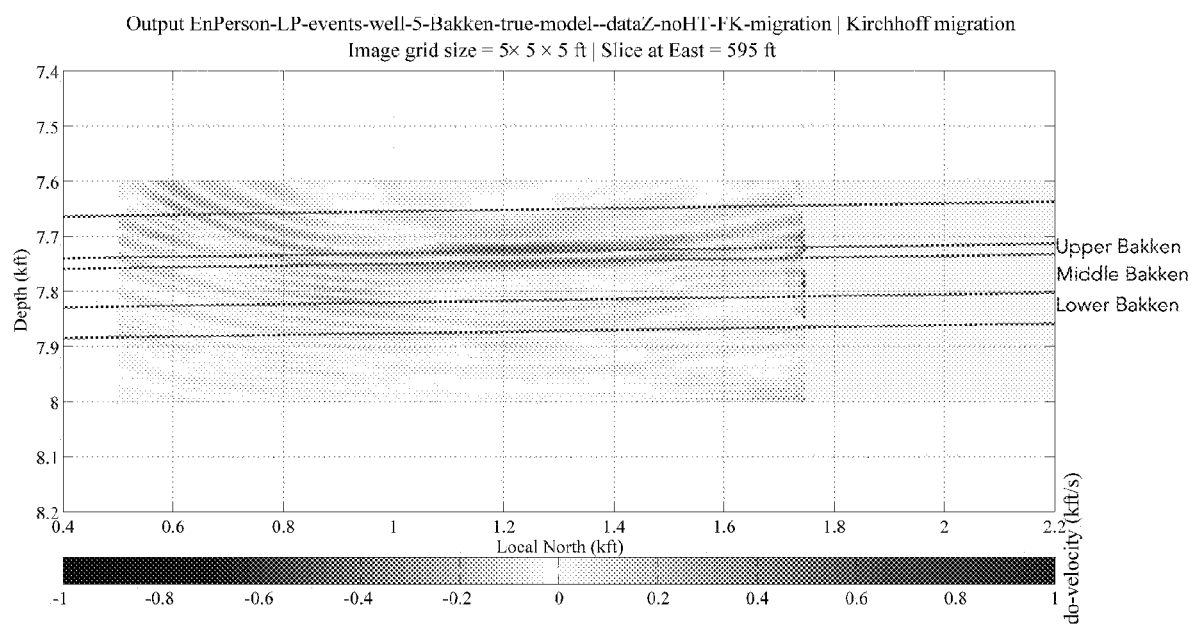
Figure 8:
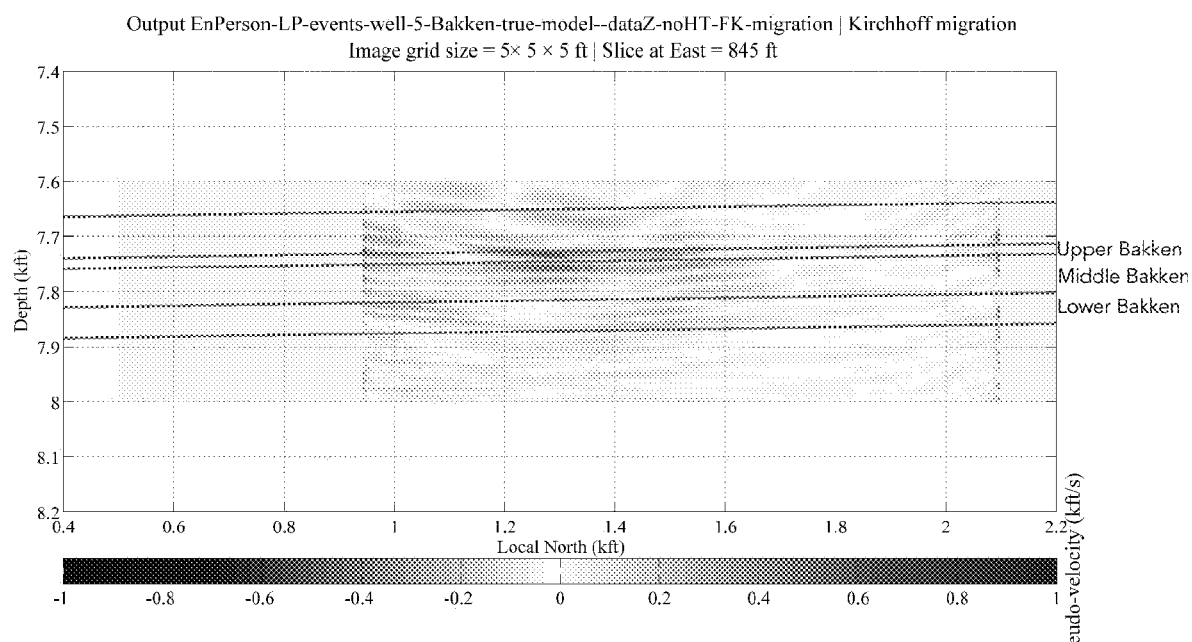

FIG. 6 is a 2-D slice at easting=345-5 feet spacing. FIG. 7 is a 2-D slice at easting=595 feet–5 feet spacing. FIG. 8 is a 2-D slice at easting=845 feet–5 feet spacing.

Figure 9:
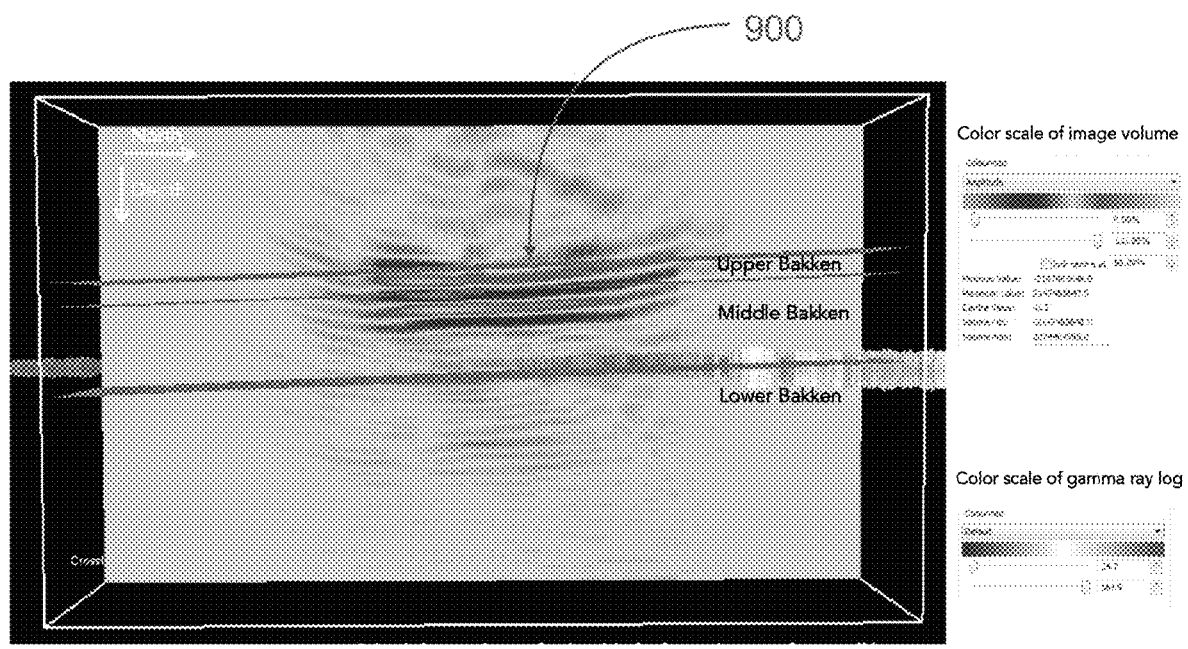
FIG. 9 is an embodiment of an illustration of the formation in accordance with the present inventions.
Figure 10:
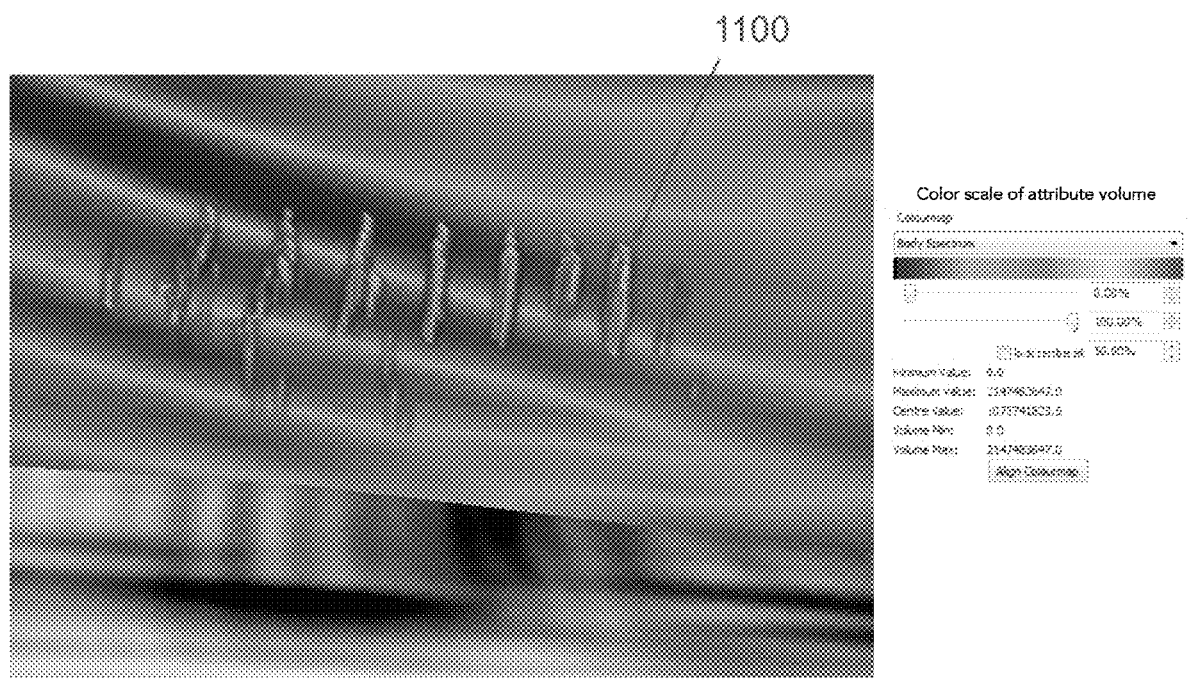
FIG. 10 is an embodiment of an illustration of the formation in accordance with the present inventions.
Figure 11A:
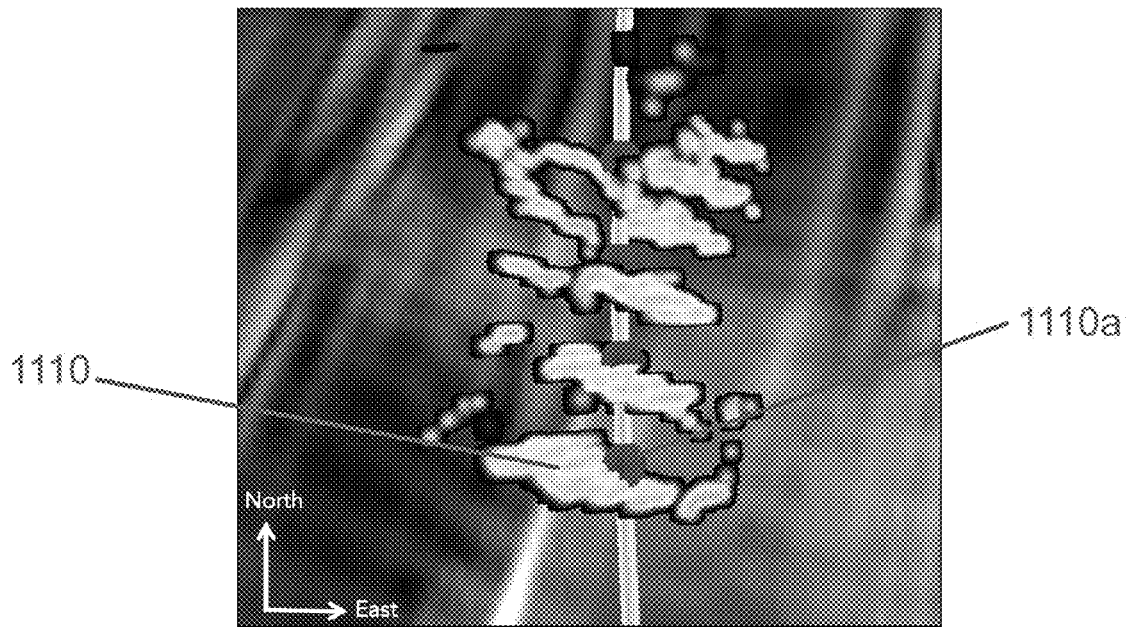
FIG. 11A is an embodiment of a plan view illustration of the formation and well structures created in accordance with the present inventions.
Figure 11B:
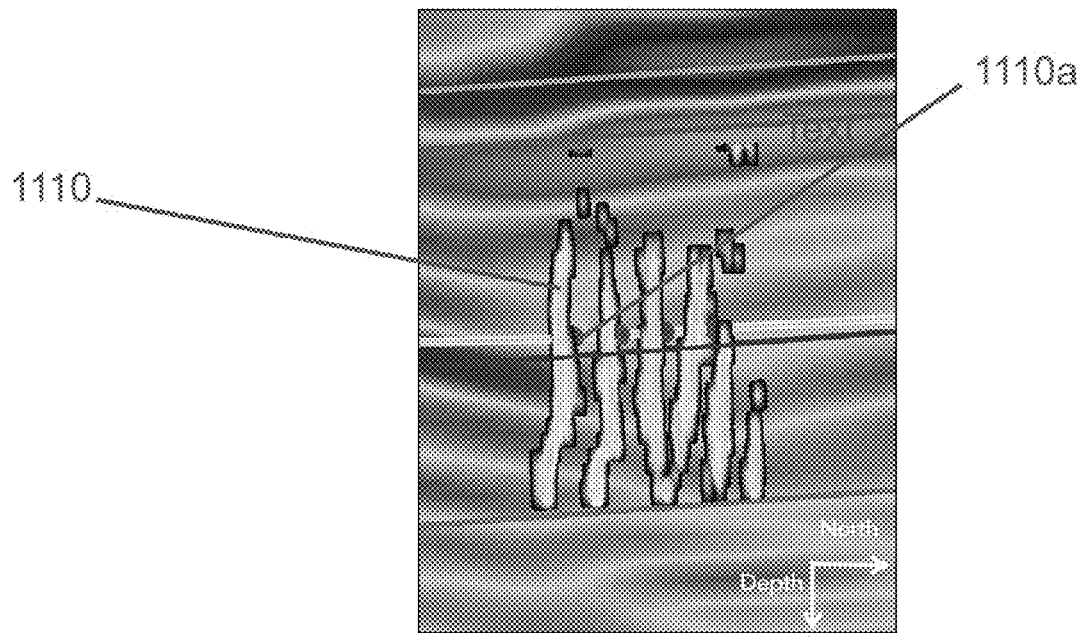
FIG. 11B is side view of the embodiment of FIG. 11A.

Using standard available interpretation software for seismic, and preferably microseismic data, such as from GeoTeric, the square phase volume, from the migration (as seen for example in FIG. 5) is imported into the software to provide the image 900 of a 30 ft Upper Bakken Interview obtained from ~300 Hz microseismic S-waves, as seen in FIG. 9. Using a fault extraction tool of the software the information that formed the image of FIG. 5, is used to yield the unique features, of about 40 ft separation between the structures, e.g. 1100, shown in FIG. 10. This information forming the image of FIG. 10 is then modeled into, or combined with, the well information, to provide the images of FIGS. 11A and 11B which shows the fractures, e.g., 1110, with respect to the perforations, e.g., 1110*a* in well H2. FIG. 11A is a plan view, and FIG. 11B is a side view The following examples are provided to illustrate various embodiments of the present reduced damage restimulation operations. These examples are for illustrative purposes, may be prophetic, and should not be viewed as, and do not otherwise limit the scope of the present inventions.

EXAMPLES

Example 1

High-Resolution Imaging Using Microseismic Events on DAS Data.

Using the high-frequency data recorded in DAS array to form high-resolution seismic images, which are used to image hydraulic fractures. The embodiment of this example has several advantages or prior systems, including: (a) Sensors are closer to the sources thus can provide much higher frequency comparing to traditional surface seismic data; (b) microseismic data generally carries frequency around 200 Hz while the surface seismic data is usually below 30 Hz. High-frequency data will improve the spatial-resolution of seismic images; (c) microseismic data have much stronger S-wave amplitude comparing to the surface seismic data, which is dominated by P-wave. S-wave is sensitive to the highly compliant fluids. Thus, the seismic attributes derived from the S-wave seismic images can be used to identify the fluid-filled hydraulic fractures; (d) DAS array forms much larger aperture (generally much greater than 2000 feet) comparing to traditional geophones (usually less than 2000 feet), while having much smaller spatial interval between the sensors. Those properties are ideal for producing high-resolution seismic images.

A velocity model is built using known-sources, such as (perforation shots) and microseismic events. Next microseismic events using geophone or DAS arrays are located. From this a reflection traveltime table between sources/sensors to the image voxels is computed. Next events on the DAS data are identified, provided they are located by geophones. The DAS data is then migrated to form a seismic image. Computations are then performed on the seismic attributes for fracture identification.

It is noted that there is no requirement to provide or address the theory underlying the novel and groundbreaking production rates, performance or other beneficial features and properties that are the subject of, or associated with, embodiments of the present inventions. Nevertheless, various theories are provided in this specification to further advance the art in this important area, and in particular in the important area of hydrocarbon exploration and production. These theories put forth in this specification, and unless expressly stated otherwise, in no way limit, restrict or narrow the scope of protection to be afforded the claimed inventions. These theories many not be required or practiced to utilize the present inventions. It is further understood that the present inventions may lead to new, and heretofore unknown theories to explain the conductivities, fractures, drainages, resource production, and function-features of embodiments of the methods, articles, materials, devices and system of the present inventions; and such later developed theories shall not limit the scope of protection afforded the present inventions.

The various embodiments of restimulation operations set forth in this specification may be used for various oil field operations, other mineral and resource recovery fields, as well as other activities and in other fields. Additionally, these embodiments, for example, may be used with: oil field systems, operations or activities that may be developed in the future; and with existing oil field systems, operations or activities which may be modified, in-part, based on the teachings of this specification. Further, the various embodiments set forth in this specification may be used with each other in different and various combinations. Thus, for example, the configurations provided in the various embodiments of this specification may be used with each other; and the scope of protection afforded the present inventions should not be limited to a particular embodiment, configuration or arrangement that is set forth in a particular embodiment, example, or in an embodiment in a particular Figure.

The invention may be embodied in other forms than those specifically disclosed herein without departing from its spirit or essential characteristics. The described embodiments are to be considered in all respects only as illustrative and not restrictive.

What is claimed:

1. A method of providing highly accurate images of hydraulic fractures in relation to a well located in a formation within the earth, the method comprising:
    a. obtaining a plurality of seismic source events; wherein the plurality of source events defines a first area, the first area having a known location with respect to at least one of the formation, the well or a structure of the well;
    b. creating a first 2-D map of seismic information, wherein the map comprises upward and down ward reflections relative to a location of a source event in the area;
    c. creating a second 2-D map of seismic information, wherein the map comprises upward and down ward reflections relative to a location of a source event in the area; wherein the second 2-D map is different than the first 2-D map;
    d. creating a third 2-D map of seismic information, wherein the map comprises upward and down ward reflections relative to a location of a source event in the area; wherein the third 2-D map is different than the first 2-D map and the second 2-D map;
    e. combining the first, the second and the third 2-D map to create a 3-D volume, the 3-D volume defining a shape and having a known location with respect to the formation, the well and to a structure of the well; and,
    f. processing the 3-D volume to obtain an image of a fracture, the image defining a shape of the fracture and having a known location with respect to at least one of the formation, the well or the structure in the well.

2. The method of claim 1, wherein the structure of the well is the well heel.

3. The method of claim 1, wherein the structure of the well is a perforation.

4. The method of claim 1, wherein the first, the second and third 2-D maps each are based upon a different source event.

5. The method of claim 1, wherein the first, the second and the third 2-D maps are each based upon the same source event.

6. The method of claim 1, wherein at least one of the first, the second or the third 2-D maps are based upon a different source event from the others.

7. The method of claim 1, wherein the fracture is a hydraulic fracture.

8. The method of claim 1, wherein the fracture is a naturally occurring fracture.

9. The method of claim 4, wherein the image of the fracture has a known location with respect to the structure of the well.

10. The method of claim 1, wherein the image of the fracture has a known location with respect to the formation, the well and the structure of the well.

11. The method of claim 1, further comprising the step of using the image of the fracture to perform an oil filed operation; wherein the oil field operation is selected from the group consisting of drilling, perforating, hydraulic fracturing, workover, and completion.

12. A method of providing highly accurate images of hydraulic fractures in relation to a well located in a formation within the earth, the method comprising:
 a. obtaining a plurality of seismic source events; wherein the plurality of source events defines a first area, the first area having a known location with respect to at least one of the formation, the well or a structure of the well;
 b. creating a first 2-D map of seismic information, wherein the map comprises upward and down ward reflections relative to a location of a source event in the area;
 c. creating a second 2-D map of seismic information, wherein the map comprises upward and down ward reflections relative to a location of a source event in the area; wherein the second 2-D map is different than the first 2-D map;
 d. creating a third 2-D map of seismic information, wherein the map comprises upward and down ward reflections relative to a location of a source event in the area; wherein the third 2-D map is different than the first 2-D map and the second 2-D map;
 e. combining the first, the second and the third 2-D map to create a 3-D volume, the 3-D volume defining a shape and having a known location with respect to the formation, the well and to a structure of the well; and,
 f. processing the 3-D volume to obtain an image of a near well bore feature, the image defining a shape of the feature and having a known location with respect to at least one of the formation, the well or the structure in the well.

13. The method of claim 12, wherein the image identifies the near well bore feature with an accuracy selected from the group consisting of: within in about 3 feet to about ¼ inch, within 2 feet or less, within 1 foot or less, within 6 inches or less, and within 1 inch or less, of the actual location.

14. The method of claim 12, wherein the image identifies the shape of the near well bore feature with an accuracy selected from the group consisting of: about 80% to 99%, greater than 80%, greater than 85%, greater than 90%, greater than 95%, and greater than 98%, of the actual shape.

* * * * *